United States Patent [19]

Portas et al.

[11] Patent Number: 5,182,096

[45] Date of Patent: Jan. 26, 1993

[54] COMPOUND APPLICABLE AS CARRIER FOR SUBSTANCES OR ACTIVE CHEMICAL, PHYSICAL OR BIOLOGICAL PRODUCTS

[76] Inventors: Abelardo A. Portas; Graciela I. O de Portas, both of Arcos 2757. 1E., 1428 Buenos Aires, Argentina

[21] Appl. No.: 611,190

[22] Filed: Nov. 9, 1990

[30] Foreign Application Priority Data

Nov. 16, 1989 [AR] Argentina ............................. 315456

[51] Int. Cl.$^5$ ...................... A01N 25/06; B05D 1/12; A61K 47/04; A61K 47/18
[52] U.S. Cl. ...................................... 424/45; 424/405; 424/DIG. 8; 424/489; 427/255.6; 427/426; 71/DIG. 1; 71/DIG. 4; 106/14.05; 428/402; 134/31; 502/439
[58] Field of Search ................... 424/45, DIG. 8, 405; 427/255.6, 426; 71/DIG. 1, DIG. 4; 106/14.05; 428/402-403

[56] References Cited

U.S. PATENT DOCUMENTS

| | | | |
|---|---|---|---|
| 3,928,536 | 12/1975 | Lewis, Jr. ............................ | 423/567 |
| 3,965,615 | 6/1976 | Portas et al. ........................ | 252/305 |
| 3,967,003 | 6/1976 | Emblem et al. ..................... | 427/133 |
| 4,129,505 | 12/1978 | Dasher et al. ....................... | 428/279 |
| 4,213,945 | 7/1980 | Haese et al. ......................... | 423/574 |
| 4,338,343 | 7/1982 | Vidal et al. .......................... | 424/612 |

*Primary Examiner*—Paul R. Michl
*Assistant Examiner*—E. J. Webman
*Attorney, Agent, or Firm*—Kenyon & Kenyon

[57] ABSTRACT

A particulate carrier for airborne suspensions of an active agent. The carrier is formed in situ by contacting a spray containing ammonia, a monoalkylamine or dialkylamine with a spray containing acetic acid and/or sulfur dioxide.

10 Claims, No Drawings

COMPOUND APPLICABLE AS CARRIER FOR SUBSTANCES OR ACTIVE CHEMICAL, PHYSICAL OR BIOLOGICAL PRODUCTS

The present invention, involves compounds (chemicals) to be used as carriers for other substances or active chemical, physical or biological products.

Conventional methods used for the spreading out of solid or liquid particles, by means of spraying systems involving known chemical or physical carriers result, normally, in particles with regular, uniform size and with physical characteristics, such as time of suspension in the air, and release of the carried substances or active products, regular and uniform.

It has been found, as a result of many trials, that acetic acid, sulfur dioxide and mixtures of the same in different proportions, when sprayed simultaneously with ammonia or lower aliphatic amines, and in such a way that both spraying get mixed up "in situ", allowing for the respective chemical reaction, produce particles carrying active products, with a size according to formulation.

Previous to this, compounds have been formulated in an attempt to obtain air-borne suspensions or carrier sols of active substances, and which will not be dependent upon the relative humidity of the environment, and at the same time, not producing undesirable chemical reactions, between the carrier and the carried substance, but with none of them has it been possible to obtain an air-borne suspension or sol, which while being inert in relation to the carried active substance, involves a slow dispersion (in the air) and an appropriate specific weight allowing it to remain in suspension in the atmosphere without lifting itself up or decanting.

The present invention duly fulfills such needs upon supplying a compound which founds its application as a carrier of sustances or active chemical products, physical or biological. This compound is formed up by two components which interact between themselves, when expelled into the open air in converging directions, from their respective containers by means of a propelling agent, thus generating "in situ" myriads of particles or very small drops, capable of sustaining themselves up in the air and be carried away by the same. At least one of the components is a substance of the group formed by ammonia, monoalkyl amines aliphatic C1-C4, different from the isopropylamine and aliphatic dialkylamines C1-C2, while the other component (components) is, at least, a substance of the group composed of by acetic acid and sulfur dioxide. Also, each component includes, as a propelling agent, a compressible gas, and as a substance or active product, of the said components to the substance or active product, and, alternatively, member of the group constituted by water, glycols, silicons oil, mineral oils, silica dioxide, sodium tetraborate, ferric chloride, sodium chloride, talc and dolomite, thoroughly divided.

It is feasible to use the acetic acid and the sulfur dioxide each one by itself or mixed, and it has been determined that when mixtures, in various proportions, are being used of said two substances as one of the components of the compound, the carrier generates particles which size depends upon the percentage relationships existing between the acetic acid and sulfur dioxide.

It is worthwhile to point out that the use of just sulfur dioxide yields only small particles, that the mixtures of acetic acid and sulfur dioxide yield medium-size particles, and that the use of just acetic acid, only big particles, speaking always of air suspensions or sols.

Ammonia used under the form of aqueous solution, generally 30% in volume, approximately; whereas with reference to aliphatic amines, the dimethylamine is preferred.

The following items are used as propelling agents: Freon (a fluorinated hydrocarbon), propane, butane and mixture of these last ones, preferably these last ones.

With reference to glycols used alternatively in this invention, we may quote propylene glycol, diethylene glycol, hexylene glycol, sorbitol and glycerine.

Air suspentions or sols, obtained as a result of the interaction of the components of the present invention, have the ability for transporting at various distances, altitudes, and places of easy or otherwise accesses, substances or active chemical, physical or biological products and their mixtures. Said suspensions or sols also show different rates of adsorption, absorption, solubility and/or emulsionability, and it is feasible to control spreading speed of the transported substance or active product. These characteristics may be emphasized through the incorporation of one or some of the optional components mentioned above, and which constitute adsorbing, absorbing, jellifying, hygroscopic, emulsifying, etc. substances, e.g. silicone oils, provide antidampness properties, sodium tetraborate provides hygroscopy, silica anhydride provides a high rate or absorbtion and adsortion, glycols stabilize the water content, etc. The carried active substances include anticorrosion oils (physically active), pesticides, solvents and paints (chemically active) and enzymes (biological active), this listing being, by no means, complete.

With the purpose of total understanding of the present invention and that it may be put into practice, with no problems, as follow examples of preferred uses—and without exhausting possibilities

EXAMPLE 1

On the basis of an aerosol container, with a capacity of 473 cm3, we pour into it 60 grms. of glacial acetic acid, 200 c.c. of a mixture of water and one glycol belonging to the group formed by propyleneglycol, diethyleneglycol, hexyleneglycol, sorbitol and glycerine, and we close the container, completing it with 176 cm3 of propellent propane-butane.

Another aerosol container, of same capacity is filled with 57 cm3 of ammonia solution at 30% in volume, 3 grms, of sodium tetraborate, anhydrous or hydrated, 200 cm3 of anticorrosion oil, and it is closed. The sodium tetraborate may be substituted by 9 grms. of ferric chloride or by 4 grms. of sodium chloride, and completing it with 176 cm3 of propellent propane-butane. Both aerosob are operated simultaneously and converging at some 20 cms. towards the iron material to be protected from corrosion. Solid particles of ammonium acetate are generated "in situ" and of big size.

The size of the particles is modified and stablized by adding substances such as sodium tetraborate, ferric chloride of sodium chloride and though the hygroscopic effect of the same. These heavy particles will transport the anticorrosion oil up to the iron material, and sticking itself up over all the surface, be it on the outside or the inside, covering all including any existing nooks.

EXAMPLE 2

An aerosol container (473 cm3) is filled with 64 grms. of liquid sulfur dioxide, 50 grms. pentaclhorophenol (fungicide) with 100 cm3 of solvent, aromatic, 1 gram silicone oil and 100 cm3 of propellant propane-butane. This oil may be sustituted by 6 grms. mineral oils. Another container of same capacity as the former one is filled with 59 grms. of dimethylamine and 20 grms. of water, completing it with 170 cm3 of propellant propane-butane.

Both containers are activated at the same time, with the two beams colliding. It results in a subtle and highly mobile mass of dimethylamine bisulfite, that will carry the fungicide through all possible directions, and covering, during more than 3 hours the environment to be sprayed. The pentachlorphenol will deposit itself upon the ceilings, wooden work, and every nook and crevice, where fungus may exist. The silicon oil or the mineral ones will have a repelling effect between the drops, resulting in smaller and lighter particles.

EXAMPLE 3

We introduce into an aerosol, container (473 cm3) 20 grms. of glacial acetic acid, 40 grms. of liquid sulfur dioxide, and 20 grms. of phenpropatrine, in solution of 150 cm3 of aromatic solvents, completing it with 160 cm3 of propellant propane-butane. We introduce in another aerosol container of same capacity 57 grms. of dimethylamine, 15 grms. of water, 3 grms. of silica dioxide, finely divided, 20 grms. ethanol and 170 cm3 propellant propane-butane. We may substitute the silica dioxide by 10 grms. talc or by finely divided 10 grms. of dolomite.

The beams from both containers are to be projected simultaneously and convergely at a height of 1.5 ms. inside the greenhouse, with instantaneous production of dimethylamine bisulfite and dimethylamine acetate particles with a size in-between that of examples 1.- and 2.-, and in accordance with the formulation of acetic acid and sulfur dioxide, it will be possible to determine the size of the particles to be formed.

The addition of silica dioxide results in greater residual effect of the particles, as it is thus avoided a rapid evaporation of the active product. We obtain the same result with the use of talc or finely divided dolomite.

The particles will cover a volume from ground level to 2 ms. high and cloud will be formed thicker than that of Example 2.- but also more mobile.

This shows a positive insecticide action on the plants on the ground and those that are in pots, in greenhouse with an approximate total volume of 3,000 m3. A greater residual effect is achieved by adding silica dioxide, talc, or dolomite, as same reduce the evaporation of the active insecticide product.

It is worthwhile to point out that trials were also carried out with monochloracetic acid, phosphorus trichloride, monobromacetic acid, acetyl halogens phosphorus tribromide and thionyl chloride, as one of the components of the compound, but proving to be unfit for the purposes of the invention, as they showed various corrosion problems in the containers. Trials were also carried out with dibutylamine, triethanolamine, dipropylamine, isopropylamine, diethylenamine and trimethylamine, as the other component, but they proved to be unfit for the purpose due to problems in their preparation.

We claim:

1. In combination,
a first component selected from the group consisting of ammonia, monoalkylamine aliphatic C1-C4 distinct from isopropylamine, and dialkylamine aliphatic C1-C2;
a second component selected from the group consisting of acetic acid and sulphur dioxide; active substances to be carried and
a propelling agent for propelling each of said components into contact with each other to generate airborne particles of small size as carriers for said active substances.

2. The combination as set forth in claim 1 wherein at least one of said components includes a member selected from the group consisting of water, glycol, silicone oil, mineral oil, silicon dioxide, sodium tetraborate, ferric chloride, talc, finely divided dolomite and mixtures thereof.

3. The combination as set forth in claim 1 wherein said propelling agent is a compressed gas selected from the group consisting of propane, butane and mixtures thereof.

4. The combination as set forth in claim 1 wherein said second component is composed of glacial acetic acid, water and a member selected from the group consisting of propylene-glycol, diethylene-glycol, hexylene glycol, sorbitol and glycerin.

5. The combination as set forth in claim 4 wherein said first component is composed of a solution of ammonia at 30% in volume, and a substance selected from the group consisting of sodium tetraborate, ferric chloride and sodium chloride.

6. The combination as set forth in claim 5 wherein said propelling agent is a mixture of propane and butane.

7. The combination as set forth in claim 1 wherein said second component is composed of a liquid solution of sulfur dioxide and a substance selected from the group consisting of silicone oil and mineral oil, and said first component is composed of dimethylamine and water.

8. The combination as set forth in claim 7 wherein said propelling agent is a mixture of propane and butane.

9. The combination as set forth in claim 1 wherein said first component is composed of dimethylamine, water and a mixture of ethanol and one substance selected from the group consisting finely divided silicone dioxide, finely divided talc, and finely divided dolomite, and said second component is composed of glacial acetic acid and liquid sulfur dioxide.

10. The combination as set forth in claim 9 wherein said propelling agent is a mixture of propane and butane.

* * * * *